(12) United States Patent
Zwierlein et al.

(10) Patent No.: US 12,288,131 B2
(45) Date of Patent: Apr. 29, 2025

(54) QUANTUM COMPUTING ARCHITECTURE BASED ON ENTANGLED FERMIONS

(71) Applicant: Massachusetts Institute of Technology, Cambridge, MA (US)

(72) Inventors: Martin Zwierlein, Belmont, MA (US); Thomas Richard Hartke, Cambridge, MA (US); Ningyuan Jia, Cambridge, MA (US); Botond Oreg, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 952 days.

(21) Appl. No.: 17/357,270

(22) Filed: Jun. 24, 2021

(65) Prior Publication Data

US 2024/0338583 A1   Oct. 10, 2024

Related U.S. Application Data

(60) Provisional application No. 63/069,279, filed on Aug. 24, 2020.

(51) Int. Cl.
   *G06N 10/40* (2022.01)
   *G01N 21/64* (2006.01)
   (Continued)

(52) U.S. Cl.
   CPC ......... *G06N 10/40* (2022.01); *G01N 21/6458* (2013.01); *G06N 10/20* (2022.01); *G21K 1/003* (2013.01); *G21K 1/006* (2013.01)

(58) Field of Classification Search
   CPC .... G06N 10/40; G06N 10/20; G01N 21/6458; G21K 1/003; G21K 1/006
   See application file for complete search history.

(56) References Cited

U.S. PATENT DOCUMENTS

2020/0185120 A1   6/2020   Keesling et al.

OTHER PUBLICATIONS

R. B. Diener and T.-L. Ho, Phys. Rev. Lett. 96, 010402 (2006) (Year: 2006).*

(Continued)

*Primary Examiner* — David E Smith
*Assistant Examiner* — Christopher J Gassen
(74) *Attorney, Agent, or Firm* — Smith Baluch LLP

(57) ABSTRACT

Fermions are the building blocks of matter. Here, we disclose a robust quantum register composed of hundreds of fermionic atom pairs trapped in an optical lattice. With each fermion pair forming a spin-singlet, the qubit is realized as a set of near-degenerate, symmetry-protected two-particle wavefunctions describing common and relative motion. Degeneracy is lifted by the atomic recoil energy, which depends on mass and lattice wavelength, thereby rendering two-fermion motional qubits insensitive to noise of the confining potential. The quantum coherence can last longer than ten seconds. Universal control is provided by modulating interactions between the atoms. Via state-dependent, coherent conversion of free atom pairs into tightly bound molecules, we tune the speed of motional entanglement over three orders of magnitude, yielding $10^4$ Ramsey oscillations within the coherence time. For site-resolved motional state readout, pairs are coherently split into their constituent fermions via a double-well, creating entangled Bell pairs.

20 Claims, 10 Drawing Sheets

(51) Int. Cl.
G06N 10/20 (2022.01)
G21K 1/00 (2006.01)

(56) References Cited

OTHER PUBLICATIONS

M. Köhl et al., Phys. Rev. Lett. 94, 080403 (2005) (Year: 2005).*
D. B. M. Dickerscheid et al., 71, 043604 (2005) (Year: 2005).*
C. Chin, et al., Rev. Mod. Phys. 82, 1225 (2010) (Year: 2010).*
G. Zürn, et al., Fermionization of two distinguishable fermions, Phys. Rev. Lett. 108, 075303 (2012) (Year: 2012).*
H. Levine, et al., Parallel implementation of high-fidelity multiqubit gates with neutral atoms, Phys. Rev. Lett. 123, 170503 (2019) (Year: 2019).*
Bergeman et al., "Atom-atom scattering under cylindrical harmonic confinement: Numerical and analytic studies of the confinement induced resonance." Physical Review Letters 91.16 (2003): 163201. 4 pages.
Busch et al., "Two cold atoms in a harmonic trap." Foundations of Physics 28.4 (1998): 549-559.
Calarco et al., "Quantum gates with neutral atoms: Controlling collisional interactions in time-dependent traps." Physical Review A 61.2 (2000): 022304. 11 pages.
Cheuk et al., "Observation of 2D fermionic Mott insulators of K 40 with single-site resolution." Physical Review Letters 116.23 (2016): 235301. 5 pages.
Cheuk et al., "Observation of spatial charge and spin correlations in the 2D Fermi-Hubbard model." Science 353.6305 (2016): 1260-1264.
Cheuk et al., "Quantum-gas microscope for fermionic atoms." Physical Review Letters 114.19 (2015): 193001. 5 pages.
Eckert et al., "Quantum computing in optical microtraps based on the motional states of neutral atoms." Physical Review A 66.4 (2002): 042317. 11 pages.
Haller et al., "Confinement-induced resonances in low-dimensional quantum systems." Physical Review Letters 104.15 (2010): 153203. 4 pages.
Haller et al., "Realization of an excited, strongly correlated quantum gas phase." Science 325.5945 (2009): 1224-1227.
Hartke et al., "Doublon-hole correlations and fluctuation thermometry in a Fermi-Hubbard gas." arXiv preprint arXiv:2003.11669 (2020). 9 pages.
Hu et al., "Ramsey interferometry with trapped motional quantum states." Communications Physics 1.1 (2018): 1-9.
Idziaszek et al., "Two atoms in an anisotropic harmonic trap." Physical Review A 71.5 (2005): 050701. 4 pages.
Kestner et al., "Anharmonicity-induced resonances for ultracold atoms and their detection." New Journal of Physics 12.5 (2010): 053016. 12 pages.
Mompart et al., "Quantum computing with spatially delocalized qubits." Physical Review Letters 90.14 (2003): 147901. 4 pages.
Nichols et al., "Spin transport in a Mott insulator of ultracold fermions." Science 363.6425 (2019): 383-387.
Olshanii, "Atomic scattering in the presence of an external confinement and a gas of impenetrable bosons." Physical Review Letters 81.5 (1998): 938. 4 pages.
Peano et al., "Confinement-induced resonances for a two-component ultracold atom gas in arbitrary quasi-one-dimensional traps." New Journal of Physics 7.1 (2005): 192. 23 pages.
Peng et al., "Confinement-induced resonance in quasi-one-dimensional systems under transversely anisotropic confinement." Physical Review A 82.6 (2010): 063633. 6 pages.
Peng et al., "Confinement-induced resonances in anharmonic waveguides." Physical Review A 84.4 (2011): 043619. 13 pages.
Saffman et al., "Quantum information with Rydberg atoms." Reviews of Modern Physics 82.3 (2010): 2313. 51 pages.
Sala et al., "Coherent molecule formation in anharmonic potentials near confinement-induced resonances." Physical Review Letters 110.20 (2013): 203202. 5 pages.
Sala et al., "Inelastic confinement-induced resonances in low-dimensional quantum systems." Physical Review Letters 109.7 (2012): 073201. 5 pages.
Van Frank et al., "Interferometry with non-classical motional states of a Bose-Einstein condensate." Nature Communications 5.1 (2014): 1-6.
Wang et al., "Coherent addressing of individual neutral atoms in a 3D optical lattice." Physical Review Letters 115.4 (2015): 043003. 5 pages.
Weitenberg et al., "Quantum computation architecture using optical tweezers." Physical Review A 84.3 (2011): 032322. 9 pages.
Zhang et al., "Confinement-induced resonances in quasi-one-dimensional traps with transverse anisotropy." Physical Review A 83.5 (2011): 053615. 13 pages.

* cited by examiner

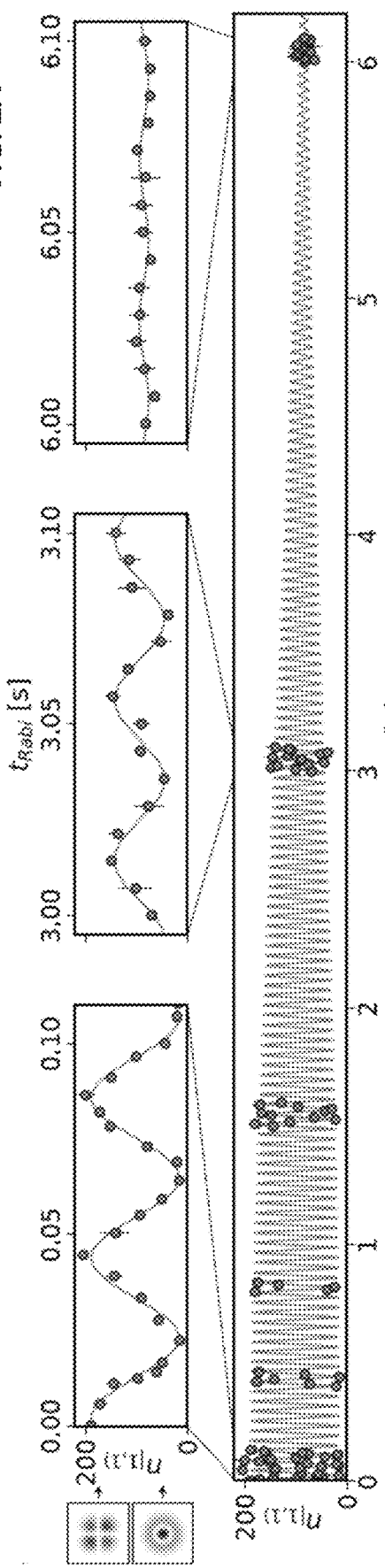
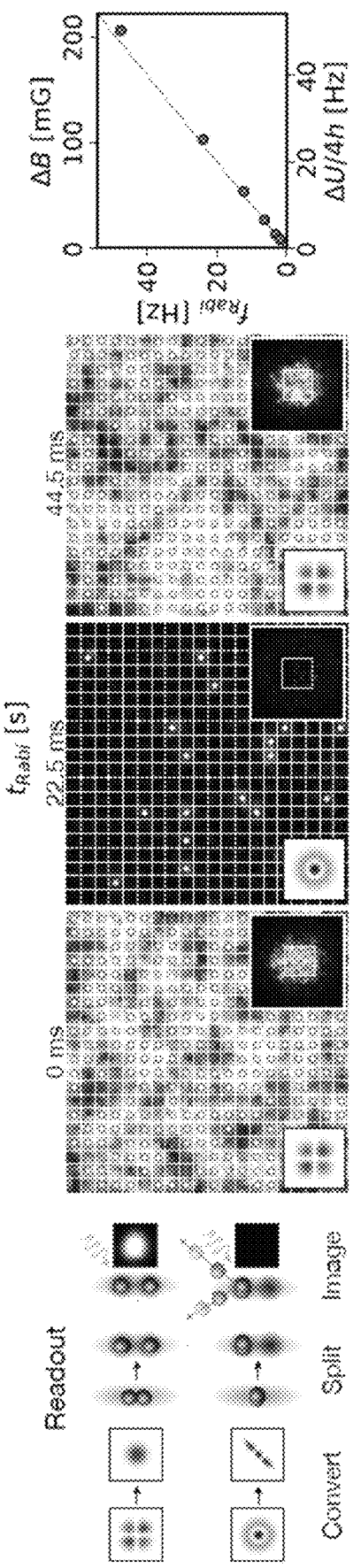
FIG. 2A
FIG. 2B
FIG. 2C
FIG. 2D

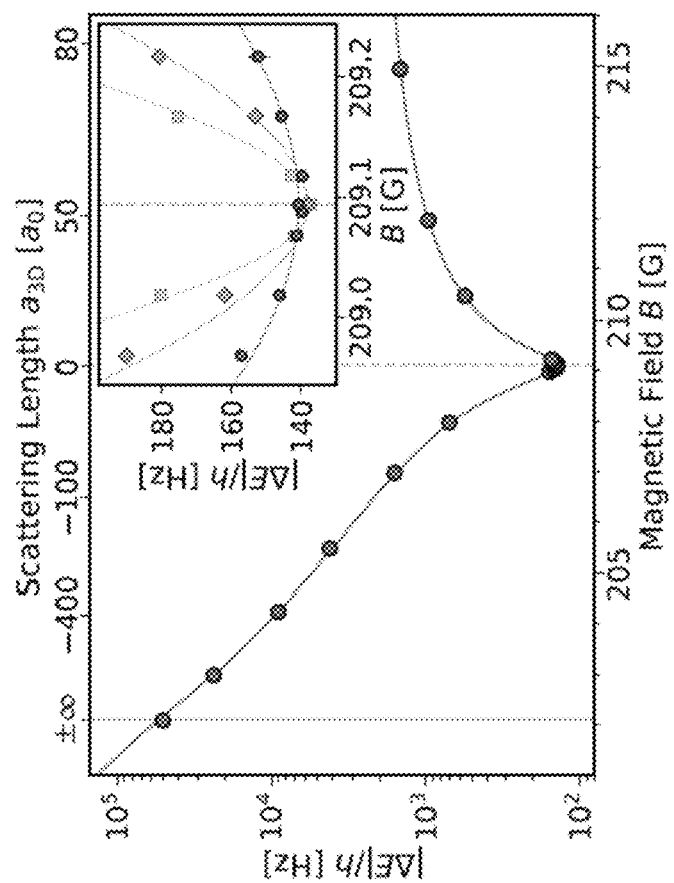
*FIG. 3C*
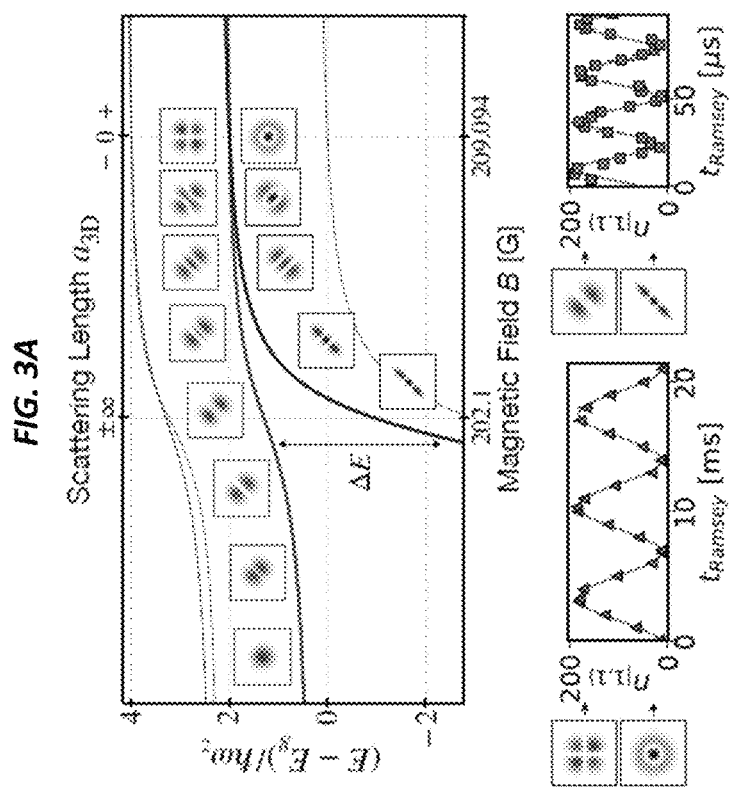
*FIG. 3A*
*FIG. 3B*

QUANTUM COMPUTING ARCHITECTURE BASED ON ENTANGLED FERMIONS

CROSS-REFERENCE TO RELATED APPLICATION(S)

This application claims the priority benefit, under 35 U.S.C. 119 (e), of U.S. Application No. 63/069,279, which was filed on Aug. 24, 2020, and is incorporated herein by reference in its entirety.

GOVERNMENT SUPPORT

This invention was made with government support under PHY-1734011 and PHY-1506019 awarded by the National Science Foundation, FA9550-14-1-0035 and FA9550-16-1-0324 awarded by the Air Force Office of Scientific Research, and N00014-17-1-2257 and N00014-19-1-2631 awarded by The Office of Naval Research. The government has certain rights in the invention.

BACKGROUND

The Pauli principle lends stability to matter, from the shell structure of nuclei and the periodic system of elements to Pauli pressure protecting a neutron star from gravitational collapse. In search of a robust quantum information architecture, one may strive to emulate the particular stability of noble gases and magic nuclei, provided by fully filled shells of fermions, which are subatomic particles, such as electrons, protons, and neutrons, with half-integral spins that follow Fermi-Dirac statistics. In other words, fermions are half-integer spin particles that obey the Pauli principle: no two fermions can occupy one and the same quantum state.

Interactions between fermions can further enhance stability, e.g., via formation of Cooper pairs in nuclear matter and superconductors, opening energy gaps and thereby carving out protected subspaces for fermion pairs. Thus, fermion anti-symmetry and strong interactions, the core challenges for classical computations of many-fermion behavior, may offer decisive solutions for protecting and processing quantum information.

SUMMARY

Our quantum register uses entangled pairs of fermions trapped in an optical lattice for storing and manipulating quantum information. In our scheme, the Pauli principle yields robust quantum information as it disallows leakage into unwanted channels. The chosen qubit subspace uses pairs of entangled fermions in a spin singlet state to reduce, by orders of magnitude, the sensitivity of the qubit to magnetic field fluctuations. The two fermions are trapped in a single well of an optical lattice, which is a crystalline structure formed by laser light. The quantum information is stored in a particular superposition of motional states of the two fermions in their well. The energy splitting of these states is purely determined by geometry, eliminating sensitivity to laser intensity fluctuations. Distributing quantum information over two physical, fermionic atoms in a spin singlet, and in two motional states, i.e., in a non-local way, results in pristine stability. This qubit can be read by mapping motional states onto dark and bright states in fluorescence imaging.

These qubits have much lower decoherence rates relative to neutral atom quantum computation platforms that rely on storage of information in atomic hyperfine states or motional states alone. They can be implemented by trapping pairs of fermions in respective elongated harmonic potential wells formed in an optical lattice. These pairs of fermions can be initialized in a qubit basis comprising a first state and a second state separated by an energy difference depending on a geometry of the optical lattice. More specifically, the energy difference between the first state and the second state can be equal to $E_r = \hbar^2 \pi^2 / (2 m a_z^2)$, where m is a mass of one fermion, $a_z$ is the spacing of the optical lattice in the z direction, and the elongated harmonic potential wells are elongated in the z direction. The first and second states may be motional states of the pairs of fermions, in which case the first state may comprise an excited state of motion for each of the two fermions in the fermion pair and the second state may comprise a ground state of motion for one fermion and a higher excited state of motion of the other fermion in the fermion pairs.

If desired, one of the elongated harmonic potential wells can be split into a double harmonic potential well. The pair of fermions can be fluorescence imaged with a detector array in the double harmonic potential well.

Each of the fermion pairs can undergo an avoided crossing between the first state and the second state. This can be accomplished by ramping a magnetic field across the corresponding elongated harmonic potential well.

With our technology, a qubit can be represented with first and second quantum objects (e.g., first and second fermions, respectively). These quantum objects are trapped in a potential energy landscape (e.g., an optical lattice) realizing a potential well (e.g., a lattice site) having quartic corrections, wherein energy corrections to the first and second quantum objects due to the quartic corrections are independent of a magnitude scale factor (e.g., an amplitude of the optical lattice) of the potential energy landscape. The qubit has a first state encoded with the first and second quantum objects in a first set of states of the potential well and a second state encoded with the first and second quantum objects in a second set of states of the potential well.

The first set of states of the potential well can comprise a first motional state and a second motional state and the second set of states of the potential well can comprise a third motional state and a fourth motional state different than the first motional state and second motional state, e.g., as described below with respect the relative and center-of-mass motion of fermions trapped in an optical lattice site. In addition, the energy levels of the states in the first set of states may sum to a value equal to a sum of energy levels of the states in the second set of states, before including quartic corrections to the energy. For example, if the potential well is an approximately harmonic potential well with three energy levels (e.g., a ground state of energy level 0, a first excited state of energy level 1, and a second excited state of energy level 2), the first set of states may be both quantum objects in the first excited state (1+1=2) and the second set of states may be one quantum objects in the ground state and the other in the second excited state (0+2=2). For a potential well with more states/energy levels, other combinations are also possible, such as sets of states corresponding to energy levels (1+3=2+2=0+4).

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., elements that are functionally and/or structurally similar).

FIG. 1A shows an array of fermion pairs prepared from a two-component, fermionic quantum gas in an optical lattice. Each lattice site (dashed box) initially contains two fermionic atoms in the spatial ground state of a 3D anisotropic harmonic trap, forming a spin singlet. Information is stored in the spatial wavefunction in the z direction, which must remain exchange-symmetric $\Psi(z_1, z_2)=\Psi(z_2, z_1)$.

FIG. 1B illustrates injection of $2\hbar\omega_z$ vibrational energy via a magnetic field sweep across a Feshbach resonance with a molecular state (dashed line at lower right) that brings the fermion pair (arrow line at upper left) to the qubit subspace. For vanishing interatomic interactions, at magnetic field $B_0$, there are two degenerate two-particle states of harmonic motion along z, with atoms either both in the first excited state $|1,1\rangle$ or with one atom carrying two excitations $|0,2\rangle_s$. The latter state is adiabatically connected to a molecular state in center-of-mass (COM) motion (solid line).

FIG. 1C illustrates full control over the fermion pair qubit via trap anharmonicity and tunable interatomic interactions. At vanishing interactions (center), anharmonicity non-linearly reduces the energy of excited harmonic states (left schematic). States $|1,1\rangle$ (upper box) and $|0,2\rangle_s$ (lower box) are split by the recoil energy $E_R=\hbar^2\omega^2/(2ma_z^2)$, determined solely by geometry (lattice spacing $a_z$) and the atomic mass m. Strong interactions ($|U|\gg E_R$, left and right side) fully mix the anharmonic eigenstates. The fermion pair stores the $2\hbar\omega_z$ vibrational energy in either center-of-mass motion $z_c=(z_1+z_2)/\sqrt{2}$ (upper right box) or relative motion $z_r=(z_1-z_2)/\sqrt{2}$ (lower right box). This avoided crossing enables universal control of fermion pair qubits.

FIG. 2A illustrates simultaneous coherent manipulation of hundreds of motional fermion pair qubits. Modulation of interactions at the recoil gap drives a Rabi oscillation between fermion pair states $|1,1\rangle$ and $|0,2\rangle_s$, measured via the number $n_{|1,1\rangle}$ of fermion pairs in state $|1,1\rangle$ in a central region of the 2D array.

FIG. 2B illustrates parallel readout of the motional fermion pair qubits. Readout proceeds by converting each fermion pair to either a molecule (lower panel) or repulsive pair (upper panel) using the Feshbach resonance. Application of a superlattice then splits repulsive pairs into their fermionic constituents for fluorescence imaging, while tightly bound molecules are ejected and appear dark.

FIG. 2C shows fluorescence images of the fermion pair qubits in parallel, with single-site resolution. The field of view displayed is 20×20 lattice sites, with lower right insets showing the entire atomic cloud.

FIG. 2D Measured Rabi frequency $f_{Rabi}$ versus the measured magnetic field modulation $\Delta B$, and corresponding calculated interaction energy modulation $\Delta U/4h$. The dashed line shows the predicted Rabi frequency $f_{Rabi}=\Delta U/4h$, in good agreement with experiment. Here, and elsewhere, error bars on $n_{|1,1\rangle}$ show standard deviation from 2-3 repetitions. Error bars representing the fit error for the Rabi frequency are smaller than datapoints.

FIG. 3A is a plot of a theoretical energy spectrum of an interacting fermion pair in the crossover to a molecular state. Pairs in the ground and second excited COM states are shown, with the qubit states highlighted (thick lines). Insets show approximate 1D pair qubit wavefunctions $\Psi(z_1, z_2)$ with a small trap anharmonicity. Energies E are calculated for an anisotropic 3D harmonic trap with $\omega_x=\omega_y=3.853\,\omega_z$. $E_g$ is the energy of the non-interacting ground state.

FIG. 3B illustrates Ramsey interferometry of the fermion pair qubit energy splitting, ranging from $|\Delta E|=h\times140.76(3)$ Hz at vanishing interactions (left panel) to $h\times36.00(3)$ kHz near the strongest explored interactions (right panel, B≈202.5 G).

FIG. 3C shows measured energy splitting versus magnetic field, from vanishing to strongly attractive and repulsive interactions. The solid line is the theoretical prediction, using the measured recoil gap as an input, without fit parameters. The inset shows the energy splitting at the recoil gap, demonstrating insensitivity to doubling the harmonic frequency from $\omega_z/2\pi=25.09(4)$ kHz (widest parabola) and 38.50(1) kHz (middle parabola) to 51.8(1) kHz (narrowest parabola). Error bars for $|\Delta E|$ represent sinusoidal fitting error and are smaller than datapoints in the main figure.

FIG. 4A illustrates a Ramsey oscillation at the recoil gap with a Gaussian envelope (triangles) with 1/e timescale of $\tau=300(10)$ ms (time series shown below). Inserting an echo $\pi$-pulse in a Ramsey oscillation (squares) extends coherence to $\tau_{Echo}=3.2(1)$ s (Gaussian fit), indicating that phase noise is static. Dressing the pair qubit at the recoil gap with modulated interactions suppresses static noise, extending the coherence time to $\tau=4.0(3)$ s for a state which is prepared perpendicular to the drive (Rabi oscillation, circles, Gaussian fit) and to $\tau=8:5(5)$ s for a state which is prepared parallel to the drive (spin-locked oscillation, diamonds, exponential fit). $U_{osc,\perp}$ denotes a Rabi drive with coupling $f_{Rabi}=23.902(4)$ Hz, while $U_{osc,\parallel}$ denotes the same drive preceded by a quarter period of free evolution.

FIG. 4B is a plot showing that the number of coherent oscillations of the fermion pair qubit per decay time, given by the quality factor $Q=|\Delta E|\tau_{Echo}/h$, grows in the molecular crossover of the fermion pair, from Q≈450 at vanishing interactions (square) to Q≈25,000 at B=202.091(8) G, near the Feshbach resonance (diamond, $\tau_{Echo}=0.49(2)$s).

FIG. 4C includes fluorescence images showing that small interaction energy variations due to the curvature of the lattice beams produce rings in a Ramsey oscillation at B=202:091(8)G after 10 ms (about 500 oscillations).

FIG. 4D includes a fluorescence images showing that a 250 ms echo sequence (about 12,500 oscillations) unwinds these rings to recover spatial coherence. The envelope data in FIG. 4A, except for echo data, are the extreme values of an independent sinusoidal fit over several cycles at each time. Echo data directly obtains the contrast. Shaded regions and decay times t are extracted from simultaneous fits to all data. Error bars from fit error in FIGS. 4A and 4B are generally smaller than datapoints.

Figure 7:
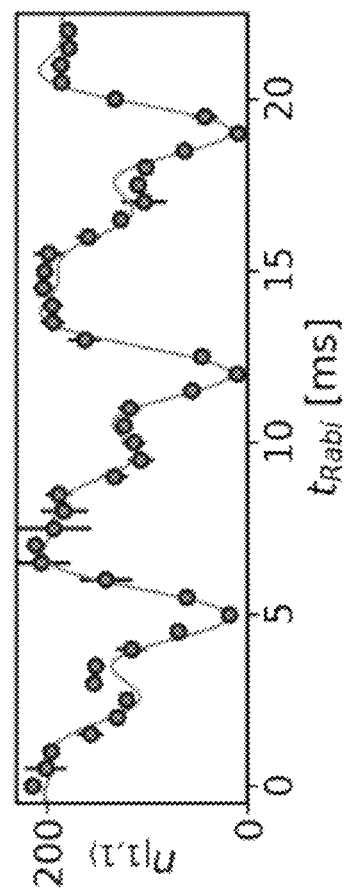

FIG. 7 is a plot of the number $n_{|1,1\rangle}$ of fermion pairs in state $|1,1\rangle$ versus time for a strongly driven Rabi oscillation. The solid line shows a phenomenological guide to the eye composed of three sinusoids with frequencies near $E_R/h$, $2E_R/h$, and $3E_R/h$. This strongly driven Rabi oscillation at the avoided crossing of FIG. 1C exhibits rapid non-sinusoidal response. The predicted Rabi coupling $\Delta U/4 = h \times 151.98$ Hz (see FIG. 2D), which is driven at a modulation frequency of 140.65 Hz, is comparable to the recoil energy gap $E_R = h \times 140.76(3)$ Hz.

Figure 8:
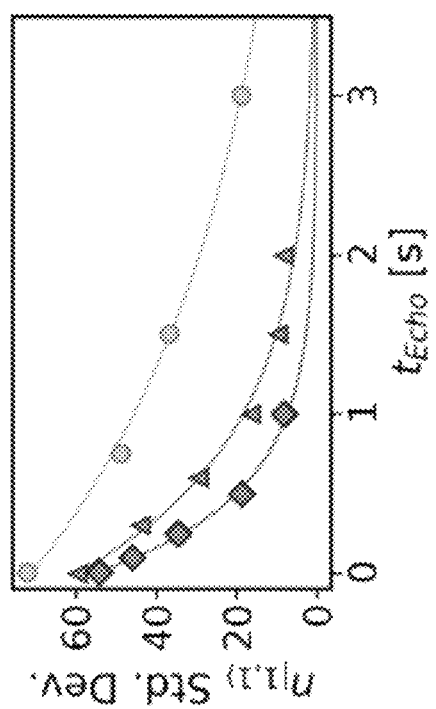

FIG. 8 is a plot of the standard deviation of the fermion pair qubit state in an echo sequence with randomized extra phase (standard deviation of $n_{|1,1\rangle}$) quantifies the coherence of the register array at strong interactions. A fitted exponential without offset has 1/e time constant $\tau = 2.3(1)$ s at $|\Delta E| = h \times 1.594(7)$ kHz (upper trace), $\tau = 0.84(5)$ s at $|\Delta E| = h \times 8.98(7)$ kHz (middle trace), and $\tau = 0.49(2)$ s at $|\Delta E| = h \times 50.7(4)$ kHz (lower trace), corresponding to magnetic fields B=206.976(8) G, B=204.235 (8) G, and B=202.091(8) G, respectively. Error bars of $\tau$ represent fit error.

DETAILED DESCRIPTION

An array of fermion pairs can used to robustly encode and manipulate quantum information. Fermionic statistics enable initialization of a low-entropy array of spin-singlet fermion pairs and restrict the fermion dynamics to a symmetry-protected subspace. Quantum information is encoded in the motional state of each fermion pair by forming superpositions of center-of-mass and relative vibrational motion. Working in a subspace of pairs of fermions decouples the quantum information from environmental noise. Strong interactions are induced via a Feshbach resonance, allowing for tunability of the two-fermion motional qubit frequency over several orders of magnitude.

A quantum register based on fermion pairs in a 2D optical lattice provides a new route towards quantum simulation and computation by leveraging Pauli exclusion for high fidelity preparation and control of spin-entangled and motionally entangled states of fermions. Local control of fermion pairs can be achieved using optical tweezers to alter the confinement or change the anharmonicity on a lattice site. Alternatively, localized Raman lasers allow for rapid (e.g., about 1 μs) variation of the interaction strength. Shorter wavelength lattices and lighter mass fermions can be used to increase the speed of the recoil gate by over two orders of magnitude.

Extensions to full gate-based control of entangled many-body states may be realized via locally induced cold collisions between fermion pairs in adjacent lattice sites or by Rydberg excitation of fermion pairs. Allowing for tunneling between adjacent lattice sites enables the exploration of extended Fermi-Hubbard models with additional orbital degrees of freedom. Furthermore, the accurate simultaneous control of hundreds of molecules in superposition with free atom pairs allows for site-resolved detection of many-body states of dipolar molecules, for tests of fundamental symmetries, and for metrology based on molecular clocks.

More generally, the qubit encoding disclosed here can be applied to any physical system with a similar energy landscape. The features of the physical system (or Hamiltonian) are simply: kinetic energy, a harmonic trap, and quartic corrections to the harmonic trap which have fixed relative magnitude (which is generally enforced by a fixed geometry of the potential). In such a system, if the harmonic trap is sufficiently deep, the lowest-lying spatial eigenstates resemble simple harmonic oscillator eigenstates and the quartic corrections to the harmonic trap are perturbative. By placing two excitations (for example, fermions) in such a system, and encoding quantum information in how these excitations are distributed between excited states of the potential, the qubit encoding is insensitive to the depth of the potential. The effects of the corrections to the spatial potential of higher order than the quartic terms can be reduced or eliminated by increasing the overall potential depth.

Alternative physical implementations of this qubit encoding are possible. For example, instead of being sinusoidal, the spatial potential could include an optical tweezer formed by a Gaussian light beam, where the lowest-lying spatial eigenstates resemble simple harmonic oscillator eigenstates in a sufficiently deep trap, and the quartic corrections to the harmonic trap are fixed in magnitude and determined by the waist and Rayleigh range of the Gaussian beam. Alternatively, the quantum information can be encoded in the excitations of a superconducting circuit formed by a capacitor and Josephson junction, where an effective energy landscape exists for the phase of the superconductor. This energy landscape is identical to a massive particle in an optical lattice, where the role of mass is fulfilled by the capacitor, and the strength of tunneling in the Josephson junction determines the depth of the effective lattice. Furthermore, while fermionic symmetry constraints protect the qubit encoding here, this encoding could be implemented with bosons as well, or with a single massive particle in a rotationally symmetric 2D potential, although in such implementations, the symmetry protections may be reduced or altered, and the initialization method is different.

A Quantum Register of Entangled Fermion Pairs

Figure 1B:
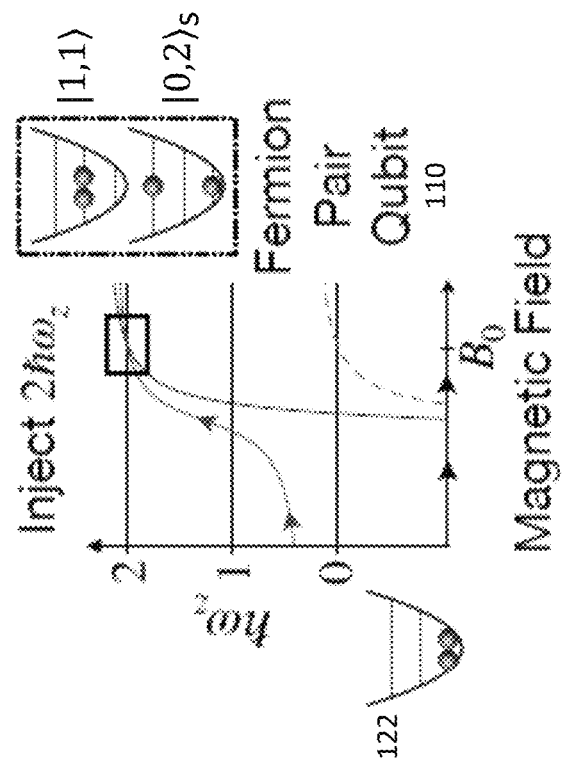
Figure 1A:
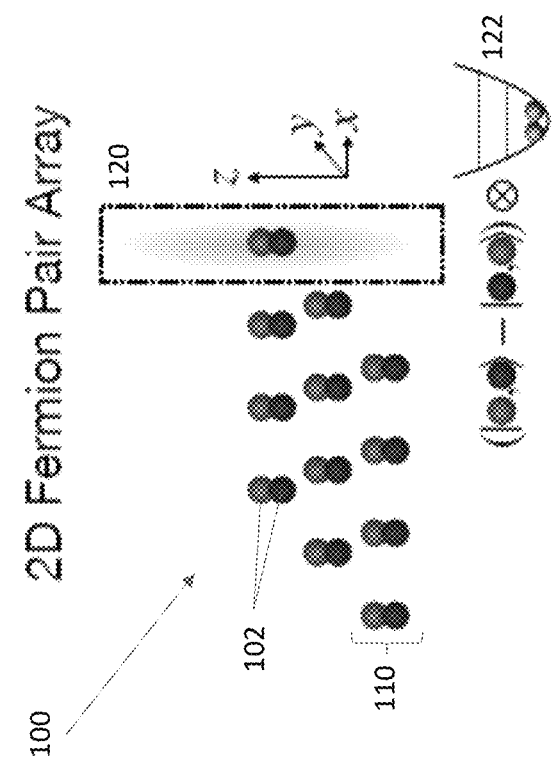
Figure 1C:
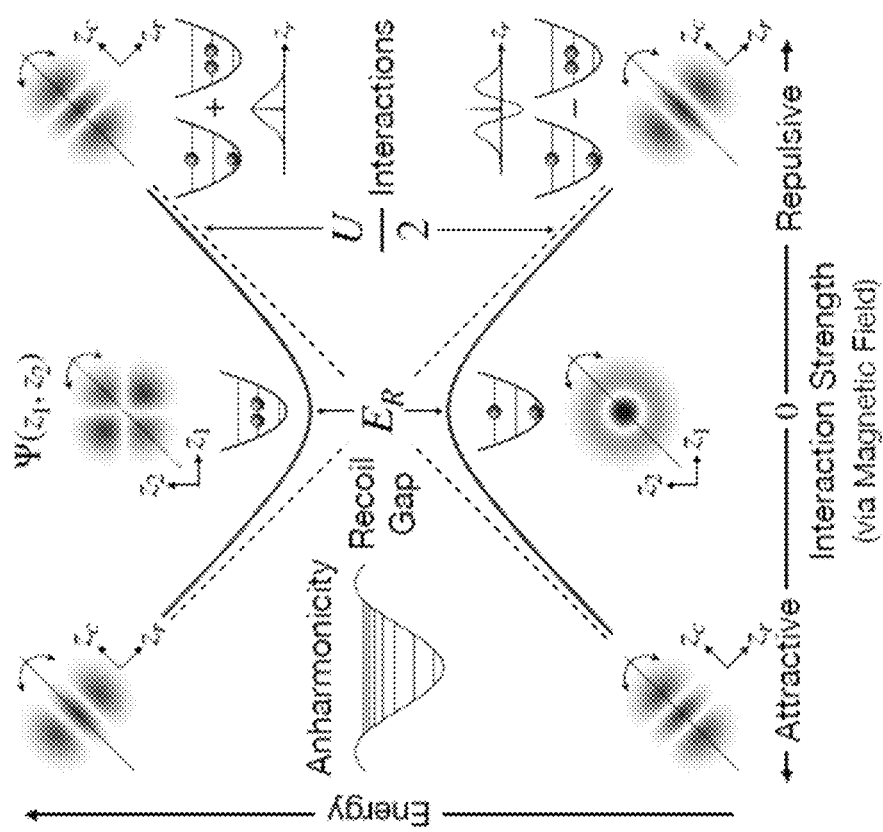

FIGS. 1A-1C illustrate spatial qubit encoding in pairs of entangled fermions. FIG. 1A shows an array 100 of fermionic neutral $^{40}$K atoms 102 that can be used as a quantum register for encoding and manipulating quantum information. The quantum register is initialized by cooling a two-state mixture of the fermionic neutral $^{40}$K atoms 102 into the lowest energy band of a 2D optical lattice. These fermions 102 group themselves into pairs 110, each of which occupies a different lattice site 120. Increasing the lattice potential creates a large array of hundreds of fermion pairs 110 in the lattice sites 120. Each lattice site 120 can be represented as an isolated potential well 122, with each fermion pair 110 occupying the 3D motional ground state of its potential well 122 as shown at lower right in FIG. 1A. The horizontal lines in the potential well 122 represent different motional (here, vibrational) energy states that can be occupied by the fermions 102 in the fermion pair 110.

During initialization, Pauli exclusion energetically freezes out triply occupied lattice sites (i.e., Pauli exclusion prevents more than two fermions 102 from occupying a single lattice site 120/potential well 122). Pauli exclusion also forces the spin wavefunction of each fermion pair 110 to be a spin singlet, thereby protecting the two-particle spatial wavefunction $\Psi(\vec{r}_1, \vec{r}_2)$ to remain exchange-symmetric at all times, $\Psi(\vec{r}_1, \vec{r}_2) = \Psi(\vec{r}_2, \vec{r}_1)$. Motion in each well 122 occurs in the quasi-1D regime, with in-plane (x-y) confinement much stronger than in the out-of-plane (z) direction (angular frequencies $\omega_{x,y} \approx 4\omega_z$) as indicated by the elongation of the lattice site 120 in the out-of-plane direction.

The quantum information (quantum bits, or qubits for short) is encoded in the subspace of vibrational states of the potential well 122 with two units of harmonic energy along z ($2\hbar\omega_z$), where exactly two symmetric two-particle states exist. In the first state $|1,1\rangle$, shown at upper right in FIG. 1B, each fermion 102 carries one excitation. In the second state $|0,2\rangle_s = (|0,2\rangle + |2,0\rangle)/\sqrt{2}$, also shown at upper right in FIG. 1B, one fermion 102 carries both quanta, leaving the other in the ground state. These two states differ only in how vibration is distributed within the fermion pair 110 and are thus immune to fluctuations in $\hbar\omega_z$. Generally, single-particle perturbations can only couple the pair states at second order. The singlet spin wavefunction being a bystander to the pair motion, fermion pairs 110 are also immune against magnetic field noise.

FIG. 1B also illustrates a Feshbach resonance that can be used to access this symmetry-protected subspace. The Feshbach resonance is caused by an avoided crossing of the atom pair 110 with a molecular state. Sweeping the magnetic field across the resonance injects $2\hbar\omega_z$ energy into the relative motion of the fermion pair promoting it to state $|2\rangle_{rel}$, while leaving the center-of-mass (COM) motion in the harmonic ground state, $|0\rangle_{COM}$. At the magnetic field $B_0$ where interactions vanish, this atom pair 110 in relative motion becomes degenerate with the state $|2\rangle_{COM}|0\rangle_{rel}$ where the two atoms 102 instead have two units of COM motion. The latter emerges from a molecular state with that same excited COM motion existing at $B<B_0$.

Control of the fermion pair qubit 110 is achieved via tunable interactions with optical and magnetic fields and the anharmonicity of the lattice potential, which couples the interacting states. FIG. 1C shows a schematic of the energy spectrum and two-particle spatial wavefunctions $\Psi(z_1, z_2)$ of the fermion pair qubit states as interactions are tuned from attractive to vanishing to repulsive using the magnetic field. For each fermion pair state, $\Psi(z_1, z_2)$ is reflection symmetric about the line $z_1 = z_2$.

At vanishing interactions, the degeneracy of the two-pair qubit states is lifted by the anharmonicity of the lattice (center of FIG. 1C). Each atom experiences an identical periodic potential $VE_R \sin(\pi z/a_z)^2$, where the lattice depth V is given in units of the recoil energy $E_R = \hbar^2 \pi^2/(2ma_z^2)$, and $a_z$ is the lattice periodicity. For $V \gg 1$ (in the experiment described below, $V \approx 8000$), atoms experience a deep lattice and are localized near the potential minima. To first order, the trap is harmonic with energy $\hbar\omega_z = 2E_R\sqrt{V}$, and the pair states $|1,1\rangle$ and $|0,2\rangle_s$ are degenerate, removing dependence of their energy difference on V. At second order, the quartic corrections $\sim VE_R(z/a_z)^4$ possess two effects. First, the characteristic size of the wave packet scales with the harmonic oscillator length $\sqrt{\hbar/m\omega_z} = (a_z/\pi)V^{-1/4}$, leading to quartic corrections $\sim E_R$ on the scale of the recoil energy, independent of the potential depth. Second, because $\langle n|z^4|n\rangle$ grows as $\sim n^2$, the single-particle energy spectrum becomes nonlinear $E_n - E_0 \approx n\hbar\omega_z - n(n+1)E_R/2$, which breaks the degeneracy of the atom pair states. As a result, $|0,2\rangle_s$ shifts below $|1,1\rangle$ by $E_R$, which we call the recoil gap. The relative fluctuations of this gap with V, due to the next order corrections $(9/8)E_R/\sqrt{V}$, are strongly suppressed by $\sqrt{V} \gg 1$, highlighting the advantages of atom pair states compared to encoding information in single-particle harmonic states. Moreover, the existence and inherent stability of the recoil gap are not specific to a lattice potential 120. They are a general feature of any anharmonic potential with rigid shape, with the role of $a_z$ replaced by another geometric scale.

When repulsive interactions dominate (right side of FIG. 1C), the fermion pair 110 behaves like two pendula coupled by a spring, and the atoms 102 oscillate with two quanta in either common or relative motion. Indeed, the higher energy pair state, when viewed along the center-of-mass and relative axes, is $|2\rangle_{COM}|0\rangle_{rel} = (|0,2\rangle_s + |1,1\rangle)/\sqrt{2}$ while the lower energy state is $|0\rangle_{COM}|2\rangle_{rel} = (|0,2\rangle_s - |1,1\rangle)/\sqrt{2}$. In the relative ground state, $|0\rangle_{rel}$ atoms 102 overlap maximally and experience a repulsive energy shift $_{rel}\langle 0|\hat{U}|0\rangle_{rel} = U$ from two-particle interactions $\hat{U}$, while in $|2\rangle_{rel}$ they overlap less strongly, leading to a weaker shift $_{rel}\langle 2|\hat{U}|2\rangle_{rel} = U/2$. The resulting energy separation between the pair states is $U/2$, which is set by the interaction strength and is experimentally controlled via the magnetic field.

Experimental Measurements of a Quantum Register of Fermion Pair Qubits

FIGS. 2A-2D show the results of an experimental demonstration of simultaneous coherent manipulation and parallel readout of hundreds of motional fermion pair qubits in an 2D optical lattice. FIG. 2A illustrates universal control of a fermion pair qubit by driving a Rabi oscillation between the recoil gap eigenstates $|1,1\rangle$ and $|0,2\rangle_s$. Analogous to other two-level systems, Rabi oscillations are produced by modulating an off-diagonal matrix element, the interaction energy $\langle 1,1|\hat{U}|0,2\rangle_s U/4$, at the frequency of the recoil gap. The oscillation is observed by counting the number $n_{|1,1\rangle}$ of fermion pairs in state $|1,1\rangle$ in a central region of the 2D array (see methods). FIG. 2B shows how the state of each qubit pair can be detected. State $|1,1\rangle$ is engineered to fluoresce when imaged with a detector array or camera, and state $|0,2\rangle_s$ is engineered to appear dark. This is achieved by coherently splitting exclusively fermion pairs in the $|1,1\rangle$ state via a double-well into two separate, spin-entangled fermions, which are subsequently imaged as shown in the top row of FIG. 2B. (The readout process is described in greater detail below.) With a single image of separated atom pairs under a quantum gas microscope, parallel readout of all fermion pair qubits in the 2D array can be achieved with single-site resolution.

FIG. 2C shows fluorescence images of 400 lattice sites over one complete Rabi cycle as the 2D register array Rabi oscillates from the $|1,1\rangle$ state (bright) to the $|0,2\rangle_s$ state (dark) and returns to the $|1,1\rangle$ state. The images were taken at 0 ms (left), 22.5 ms (center), and 44.5 ms (right) and are arranged in a 20×20 grid over the field of view. The insets at lower left show the prevalent qubit states at the different times. The insets at lower right show the entire atomic cloud at the different times.

FIG. 2D is a plot of the measured Rabi frequency $f_{Rabi}$ versus the interaction modulation $\Delta U/4$, calculated from the calibrated trap parameters and scattering properties described below. It shows that the measured Rabi frequency $f_{Rabi}$ of the interaction-driven pair qubit agrees well, for moderate driving, with the interaction modulation $\Delta U/4$. The robust energy separation between the pair qubit states and other symmetry-protected states of the fermion pair allows increasing the Rabi coupling to values at and beyond the recoil gap. In this non-perturbative regime of strong driving, the fermion pair exhibits a non-sinusoidal response which can be used for quantum control at rates exceeding the energy gap.

FIGS. 3A-3C illustrate that the fermion pair qubit can coherently crossover into the molecular regime of tightly bound fermion pairs. This enables wide tunability of the pair qubit frequency and opens up applications for molecular clocks and molecule-based quantum information protocols. FIG. 3A shows the calculated energy spectrum of the fermion pair in the molecular crossover. The thick lines in the middle of the plot represent the qubit states. The inset plots show the wavefunctions for the ground (upper row) and second excited (lower row) center-of-mass (COM) motion states.

For every state of COM motion, there is an identical ladder of states of relative motion, starting with the molecular state. The pair qubit states approach degeneracy for vanishing interactions, at the zero of the scattering length $a_{3D}$. There, the approximate 1D two-particle spatial wavefunctions (insets) approach the eigenstates $|1,1\rangle$ and $|0,2\rangle_s$ of the recoil gap. For increasing attraction, moving towards the Feshbach resonance, the lower energy state first evolves into $|2\rangle_{COM}|0\rangle_{rel}$ and then into a deeply bound molecular state with COM motion, with the two atoms therefore strongly bound to each other, as seen by their wavefunction being concentrated near the diagonal $z_1 \approx z_2$. In stark contrast, the higher energy state evolves into $|0\rangle_{COM}|2\rangle_{rel}$ and then into a strongly repulsive, "fermionized" pair, with largely reduced probability for the two atoms to be at the same location. Near the point of fermionization, additional, narrow anharmonicity-mediated resonances exist with molecules in excited transverse COM states, where coherent interconversion has been demonstrated.

FIG. 3B shows Ramsey interferometric measurements of the qubit register states. At vanishing interactions (left panel) anharmonicity interferes the fermion pair states $|1,1\rangle$ and $|0,2\rangle_s$ at the recoil gap frequency $E_R/h=140.76(3)$ Hz. In contrast, at strong interactions (right panel) the molecular binding energy drives a much faster Ramsey oscillation at 36.00(3) kHz between a 2D array of strongly repulsive fermion pairs and a lattice of tightly bound molecules.

FIG. 3C is a plot of energy splitting versus magnetic field obtained by making Ramsey measurements across the Feshbach resonance. These measurements demonstrate the ability to tune the frequency of the fermion pair qubit, and thus the entangling speed of the motion of fermion pairs, over multiple orders of magnitude.

The recoil gap features suppressed sensitivity to laser intensity noise. The inset of FIG. 3C shows the energy gap near zero interactions at different lattice depths (here, at harmonic frequencies 25.09(4) kHz (bottom trace), 38.50(1) kHz (middle trace), and 51.8(4) kHz (top trace)). As the trap depth is increased four-fold, the harmonic energy $\hbar\omega_z$ doubles, while the recoil gap energy changes by only 2.40(6)%. Moving away from the avoided crossing, the energy difference begins to be determined by interactions. In this regime, increasing the trapping depth confines the atomic wavefunction more tightly and enhances interactions, thus enabling local manipulation of the pair qubit frequency with targeted laser beams.

Figure 4C:
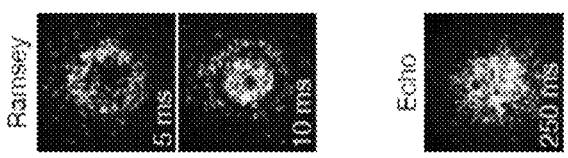
Figure 4B:
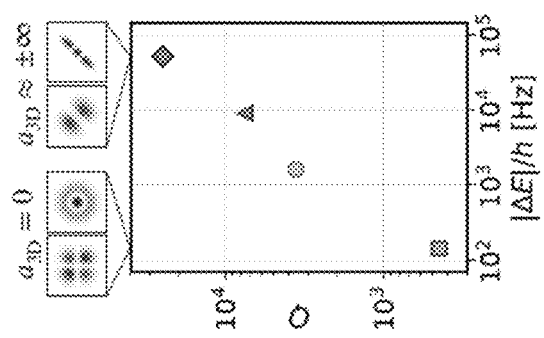
Figure 4A:
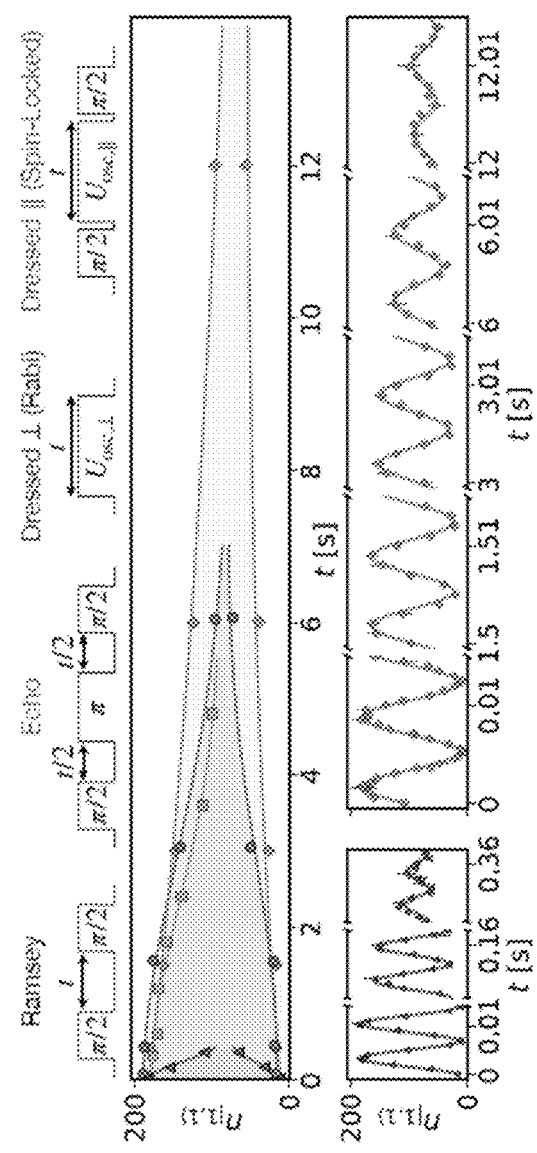

FIGS. 4A-4D illustrate how to increase coherence of a fermion pair qubit to several seconds using different pulse sequences. FIG. 4A illustrates measurements of Ramsey oscillations at the recoil gap for by illuminating the fermion pair qubit with different Ramsey, echo, dressed perpendicular (Rabi oscillation), and dressed parallel (spin-locked oscillation) magnetic field pulse sequences (top). These pulse sequences are described in greater detail below with respect to FIGS. 6A-6C.

The upper plot shows the envelopes of the coherent fermion pair qubit oscillation for the different pulse sequences. The lower plots show the oscillations of the fermion pair qubits for the different pulse sequences. The decay envelopes for the different pulse sequences provide insight into noise sources and increasing the qubit coherence time. The Ramsey pulse sequence produces a decay envelope (triangles) that yields the intrinsic phase noise. The superposition decays in $\tau=300(10)$ ms after about 40 recoil oscillations, with random spatial structure. In contrast, if an echo Tt-pulse (squares) is inserted into the Ramsey oscillation to cancel static noise, the coherence time increases to $\tau_{Echo}=3.2(1)$ s, corresponding to about 450 recoil oscillations and $10^5$ harmonic oscillator periods. In combination, these observations indicate the presence of a near static spatial variation of recoil gap energies on the order of about 0.75 Hz, or 0.5% $E_R$, within the 2D array of fermion pair qubits.

Modulating interactions at the recoil gap frequency reduces or eliminates the effects of static noise at the recoil gap. This dressing scheme preserves the quantum information in an arbitrary qubit state for over 4 seconds. The method is analogous to applying an oscillating transverse magnetic field in order to stabilize an ensemble of dephasing spins. In the frame rotating with the drive, the applied static field is perpendicular to and much larger than any residual dephasing fields, leading to a uniform quantization energy across the ensemble, thereby preserving arbitrary state superpositions. Here, interaction dressing extends coherence to $\tau=4.0(3)$ s (circles in FIG. 4A) for a state prepared perpendicular to the drive, corresponding to a Rabi oscillation. If the fermion pair qubit is instead first rotated to align with the drive, in spin-locked operation, the coherence time increases to $\tau=8.5(5)$ s (diamonds in FIG. 4B), and oscillations are still visible after 12 seconds with good signal to noise ratio. This driven operation increases the coherence from the dephasing time $T_2$ to the population decay time $T_1$ and causes the decoherence rates to approach the natural limits provided by the measured bit-flip rates and loss rates for the two pair qubit states as described below.

FIG. 4B is a plot of the quality factor $Q=|\Delta E|\tau_{Echo}/h$ as a function of interaction strength and thus of the fermion pair qubit energy splitting $|\Delta E|$. (In other words, FIG. 4B illustrates measurements of coherence at finite interaction strength.) Remarkably, near the scattering resonance, a superposition of a repulsive fermion pair and a tightly bound molecule remains coherent for about 25,000 Ramsey oscillations when the fermion pair qubit is rotated to align with the drive sequence. The dominant source of decoherence at strong interactions is the underlying curvature of the optical lattice beams, which leads to a radial variation of the local well depth, and a corresponding reduction of the interaction energy by about 0.2% at 10 sites from the center of the array. This can be observed as spatial rings in a Ramsey experiment near the Feshbach resonance, as in FIG. 4C, taken after about 500 oscillations. With an echo pulse (FIG. 4D), these rings refocus spatially even after about 12,500 oscillations.

Experimental Setup

Figure 5A:
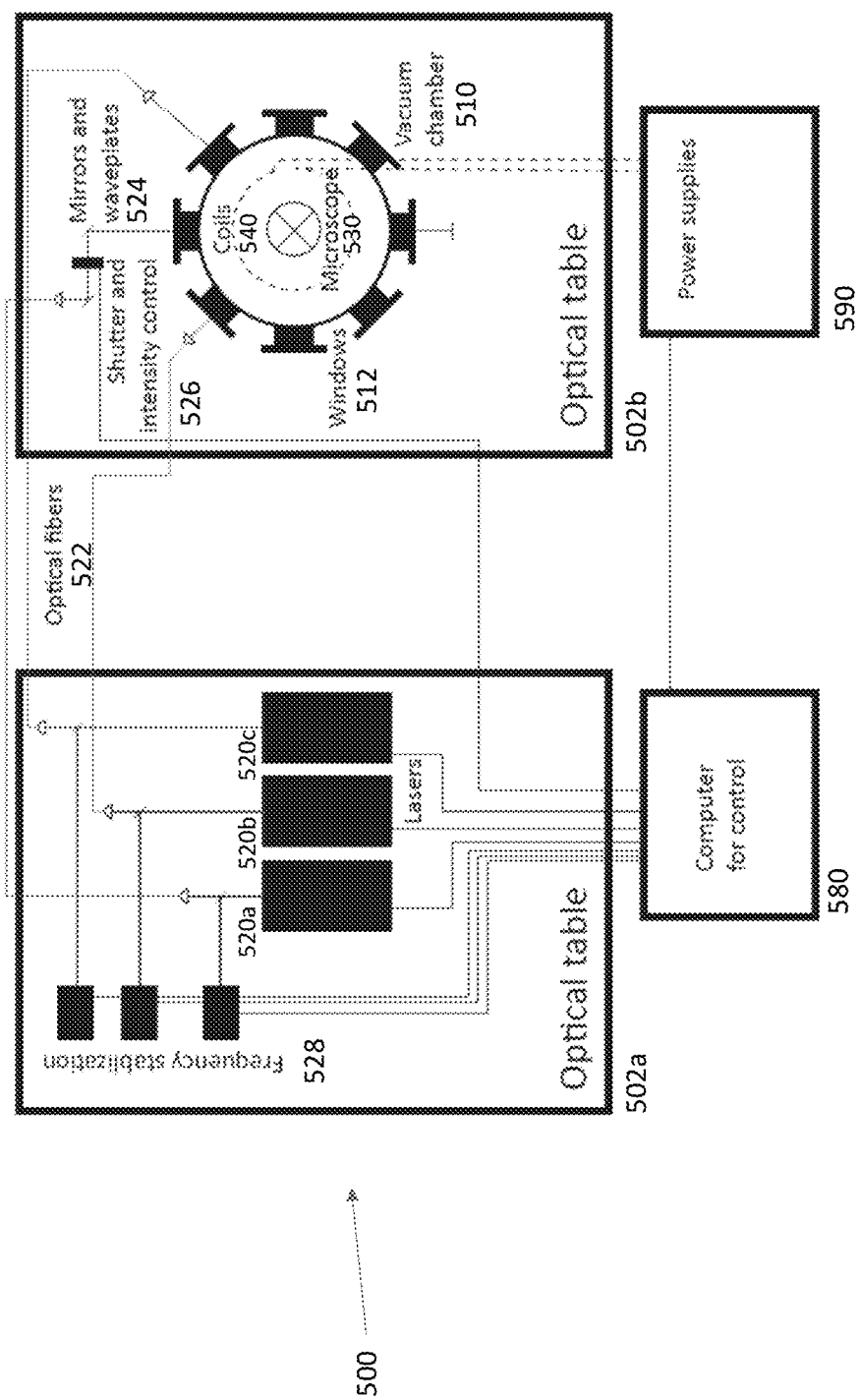
FIG. 5A illustrates an experimental implementation of a quantum register system.
Figure 5B:
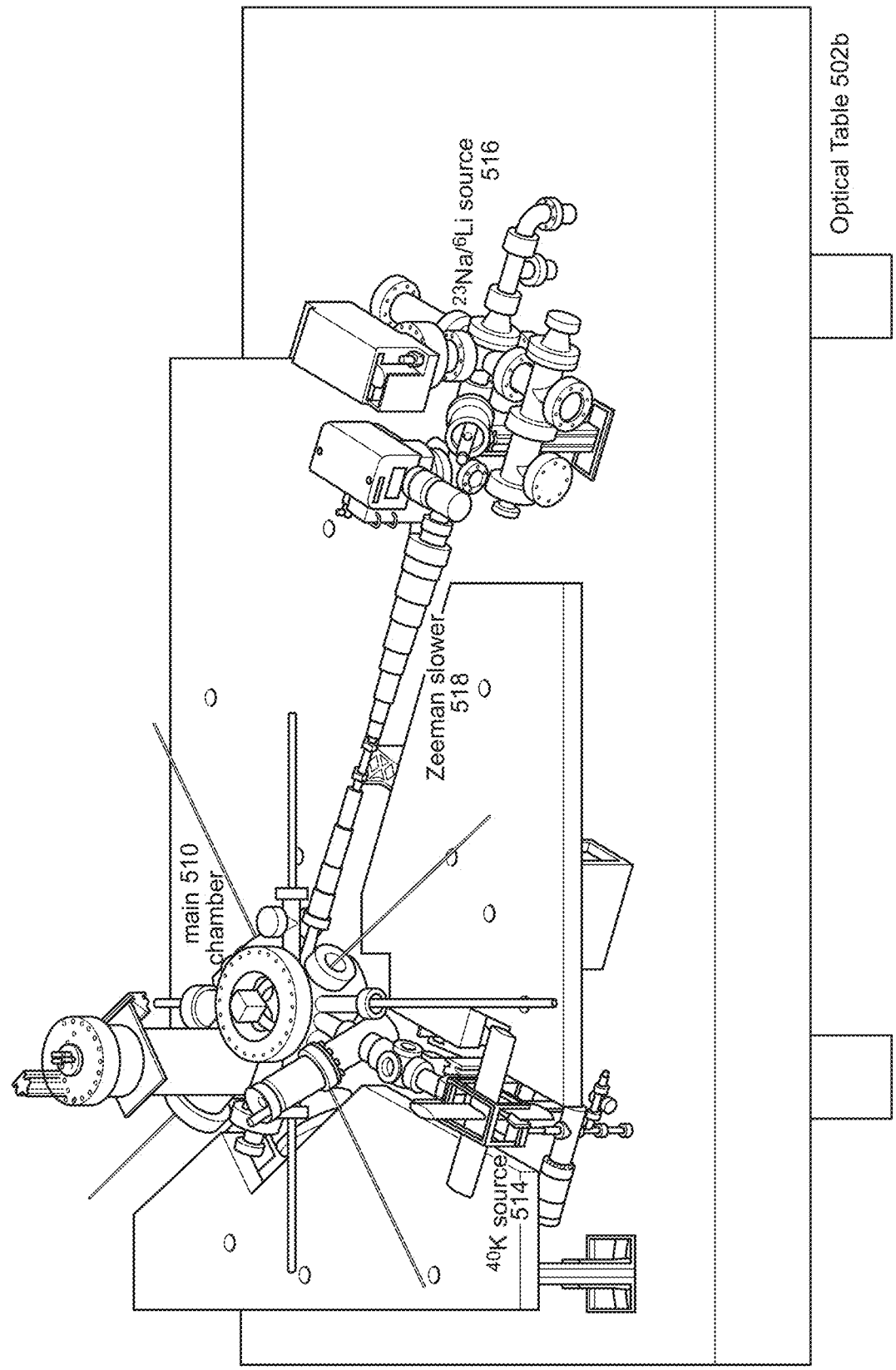
FIG. 5B illustrates atomic beam sources in the quantum register system of FIG. 5A.
Figure 5C:
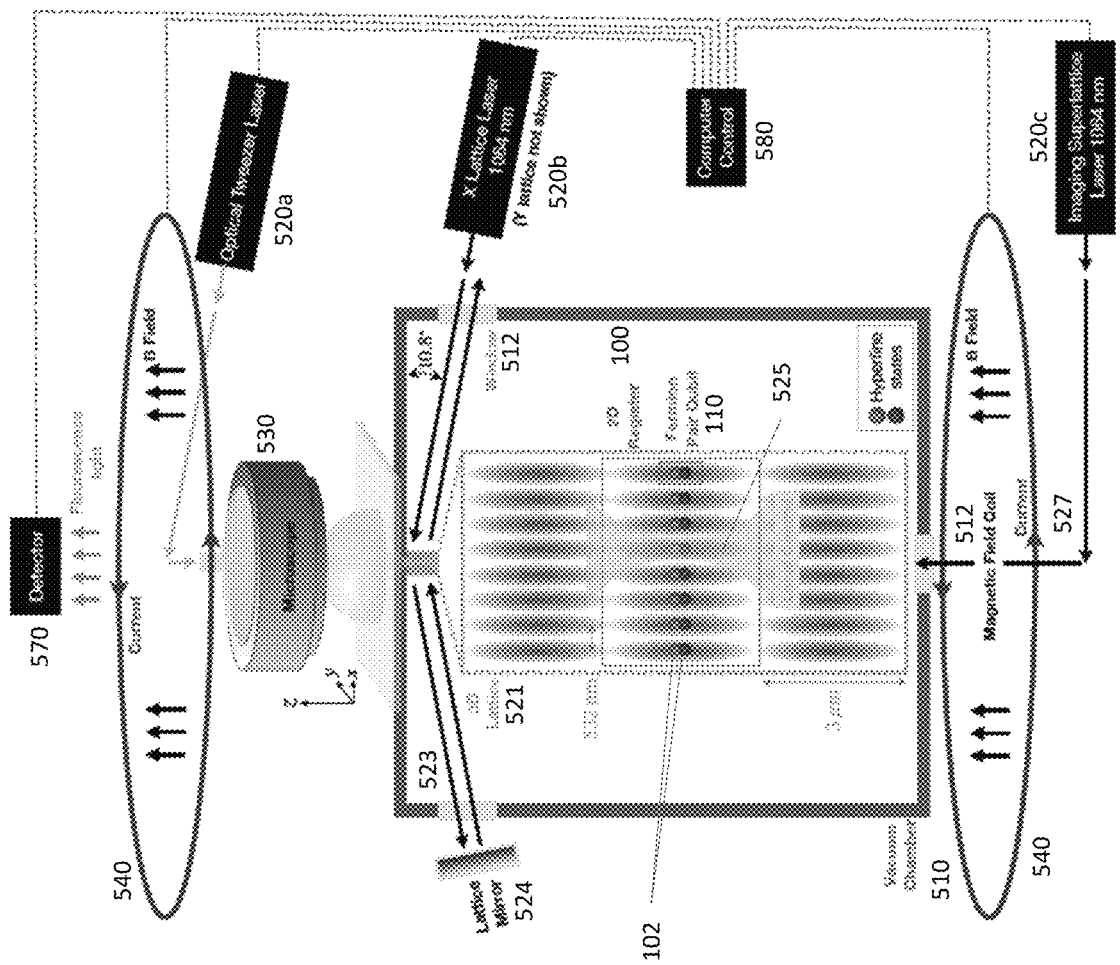
FIG. 5C illustrates a cross section of vacuum chamber with fermion pairs trapped in an optical lattice.

FIGS. 5A-5C show different views of a system 500 that can be used to encode and manipulate a 2D qubit register 100 composed of fermion pairs 110 trapped in one layer of a 3D optical lattice 521. The system 500 includes a vacuum chamber 510 that contains the quantum register 100 and is mounted on an optical table 502b. Another optical table 502a supports lasers 520a-520c (collectively, lasers 520) as well as laser frequency stabilization circuitry 528, which locks the laser wavelengths to a frequency reference. Optical fibers 522 guide beams from the lasers 520 to the vacuum chamber 510 via mirrors and waveplates 524, which alter the propagation directions and polarization states of the beams;

shutters and intensity modulators 526, which modulate the amplitudes of the beams; and windows 512, which admit light into the vacuum chamber 510. The shutters and intensity modulators 526 can turn the laser beams on and off for pulse control and/or for manipulating sites 120 in one x-y layer of the 2D optical lattice that traps the fermion pairs 110. A microscope 530 can focus one of the laser beams onto fermion pairs 110 in different lattice site 120. A detector array 570 images the fermion pairs 110 via the microscope 530 as well. And electromagnetic coils 540 generate a variable magnetic field that can be used to tune the interaction strength between the fermions 102 in the fermion pairs 110.

The fermion pair qubits 110 are composed of $^{40}K$ atoms from a $^{40}K$ source 514 coupled to the main vacuum chamber 510 as shown in FIG. 5B. Atoms from a Na/Li source 516 cool the $^{40}K$ atoms. A small amount of solid Na metal is heated within the Na/Li source 516, giving off hot Na atoms that propagate toward the vacuum chamber 510. A Zeeman slower 518 in the path of the Na atoms slows this hot stream of Na atoms to very low velocity as they approach the vacuum chamber 510. A cloud of the Na atoms is then trapped inside the vacuum chamber 510. The $^{40}K$ atoms are loaded separately into the vacuum chamber 510, where they are kept in thermal equilibrium with the trapped Na atoms so that cooling the Na atoms also cools the $^{40}K$ atoms. When trapped in the optical lattice 521, the $^{40}K$ atoms are in the two lowest hyperfine states of $^{40}K$: $|F=9/2, m_F=-9/2\rangle$ and $|F=9/2, m_F=-7/2\rangle$. These states possess an approximately 7 G wide s-wave Feshbach resonance at $B_\infty \approx 202.1$ G, which allows tuning of the interaction strength using the magnetic field, and a zero crossing of interactions at $B_0=209.094(8)$ G.

FIG. 5C shows a detailed cross section of the vacuum chamber 510. The fermion pairs 110 are trapped in a 2D (x-y) layer of a 3D optical lattice 521 formed by interfering orthogonal lattice beams 523 (for clarity, FIG. 5C shows the x lattice beam but not the y lattice beam). The lattice beams 523 can be generated by a single laser 520 operating at a wavelength of 1064 nm. Each lattice beam 523 is polarized in the x-y plane and propagates through a window 512 near-horizontally in either the x or y direction, with a shallow angle of incidence to the x-y plane of about 10.2°. The lattice beams 523 reflect off the (horizontal) super-polished substrate of the quantum gas microscope 530 at this angle to form a long wavelength lattice in the z direction ($a_z \approx 3$ μm), before being directly retroreflected by a mirror 524 to form a short wavelength lattice in the x and y directions ($a_x \approx a_y \approx 541$ nm). The net potential in the z direction on each lattice site 120 is the sum of the two potentials formed by the x and y lattice beams 523. After initialization, the lattice potential is kept sufficiently deep to prevent tunneling between lattice sites 120 (FIG. 1A) on the relevant timescales.

The fermion pairs 110 can be manipulated by varying the magnetic field produced by the magnetic field coils 540, which are at opposite ends of the vacuum chamber 510 and concentric with the z axis (the elongated dimension of the 3D optical lattice 521). Varying the amplitude of the current running through the coils 540 changes the amplitude of the magnetic field along the z axis. This current can be pulsed to increase the coherence time as explained with respect to FIGS. 4A-4D and 6A-6C.

In a typical experiment, the atoms 102 are prepared near 151 G at repulsive interactions. To initialize fermion pairs 110 in the qubit subspace, the coils 540 ramp the magnetic field across the Feshbach resonance to 208 G in about 80 ms, which is sufficiently fast to avoid narrow resonances between fermion 110 pairs and molecules in higher COM states, either in transverse or z-directional motion, that all occur at fields below about 202 G. The coils 540 ramp the magnetic field further to zero interactions at 209.094 G, in another roughly 100 ms, to initialize fermion pairs in the state $|1,1\rangle$, the upper of the two recoil eigenstates. At the recoil gap, the measured loss rates for the two pair qubit states $|1,1\rangle$ and $|0,2\rangle_s$ are 0.00(2) Hz and 0.08(3) Hz, respectively, and the measured bit-flip rates are 0.06(1) Hz and 0.05(3) Hz.

To drive Rabi oscillations between the $|1,1\rangle$ and $|0,2\rangle_s$ states at the recoil gap, interactions are modulated from repulsive to attractive at 140.65 Hz using a magnetic field generated by the coils 540. State $|1,1\rangle$ is converted to state $|0,2\rangle_s$ and vice versa with probability 99.9973(3) %, as calculated from the decay of the contrast of Rabi oscillations ($f_{Rabi}=23.902(4)$ Hz, $\tau=4.0(3)$ s, Gaussian fit). Some fermion pairs 110 in excited vibrational states give spurious, but constant, contributions to the signal, reducing oscillation contrast to 92(1) %. A route to improve this contrast through better sample preparation techniques has been demonstrated in recent experiments that achieve low-entropy arrays with fermion pair densities exceeding 99.5%.

For readout, an additional 1064 nm superlattice beam 527 from laser 520c illuminates the fermion pair qubit(s) 110 through a window 512 in the bottom of the vacuum chamber 510. (Alternatively, the lattice beams 523 and superlattice beam 527 can be generated by the same laser.) This superlattice beam 527 is directly retroreflected in the z direction (532 nm lattice spacing), coherently separating the long wavelength z lattice into a double well, as described above with respect to FIG. 2B. This double well can be formed by a combination of the 3D lattice 521 and the superlattice beam 527. The double well can be tilted by changing the vertical location of the 3D lattice 521 relative to the superlattice beam 527. Moving the 3D lattice 521 up or down (e.g., by changing the angle(s) at which the lattice beam(s) 523 reflects off the microscope facet using the optical components 524) tilts the double well. This superlattice beam 527 remains off except during readout.

Through readout, only lattice sites 120 with two atoms originally in state $|1,1\rangle$ appear bright, while sites with two atoms initially in state $|0,2\rangle_s$ appear fully dark as sensed by the detector array 570, such as a CCD, through the microscope 530. Imperfect preparation of pair qubits can lead to some sites that are occupied by fluorescent single atoms. To more easily distinguish state $|1,1\rangle$ from these single atoms, the applied double well is tilted during the splitting process to move all singly occupied sites into a specific layer, which can then be made dark by tuning the relative fluorescence of the two vertical layers. The variable $n_{|1,1\rangle}$ counts the bright sites in a circle of radius 10 sites at the center of the atomic cloud. Repeated images of the same cloud reveal an imaging loss of $n_{|1,1\rangle}$ of about 12%. Improved imaging loss rates near about 2% have been demonstrated.

The fermion pairs 110 can also be manipulated with an optical tweezer beam 525 from one of the lasers 520a. The optical tweezer beam 525 can manipulate a fermion-pair qubit 110 by altering the confining potential experienced by the fermion-pair qubit 110 or by altering the interaction strength between the fermions in the fermion-pair qubit 110 as described below. This optical tweezer beam 525 is at a wavelength that is not resonant with any fermion energy level transition to prevent undesired excitation. The optical tweezer beam 525 can be shaped or spatially modulated with a liquid-crystal spatial light modulator (SLM), a microelectromechanical systems (MEMS) mirror array, or another suitable device to produce a desired spatial pattern in the focal plane of the microscope 530. This modulation can be varied in time, e.g., to shift the optical tweezer beam 525 from one lattice site to another lattice site or to manipulate a particular fermion pair in a particular way.

The optical tweezer beam 525, optical lattice 521, and magnetic coils 540 are controlled by a computer 580 that is coupled to the lasers 520, active optical components 526, frequency stabilization circuitry 528, and magnetic coils 540. All of the components are powered by one or more power supplies 590. In this example, many of the optical components are mounted on two different optical tables 502a and 502b, but they could also be mounted on the same optical table. The system can also be made much more compact with integrated electronics and optics and a smaller vacuum chamber.

Energy Spectrum Calculation

The energy spectrum of two identical atoms in a 3D, anisotropic harmonic trap interacting via a delta function potential can be calculated exactly, given the 3D scattering length and the harmonic trap frequencies. The trap frequencies $\omega_x/2\pi=96.84(4)$ kHz, $\omega_y/2\pi=96.55(4)$ kHz, and $\omega_z/2\pi=25.09(4)$ kHz are measured via lattice intensity modulation spectroscopy. The 3D scattering length $a_{3D}$ of the lowest two hyperfine states of $^{40}$K as a function of magnetic field is provided by a theoretical calculation, adjusted for the new precise measurement reported here (FIG. 3C inset) on the location of the scattering length zero: $B_0=209.094(8)$ G. The scattering length is well approximated by the formula $a_{3D}=a_{bg}[1-(B_0-B_\infty)/(B-B_\infty)]$ with $B_\infty=202.1$ G and $a_{bg}=167.6 a_0$, where $a_0$ is the Bohr radius. The mean value of $\omega_x$ and $\omega_y$, which differ by less than 0.4%, is used to obtain a trap ratio $\omega_x/\omega_z=\omega_y/\omega_z=3.853(6)$ for input to the theory for an anisotropic 3D harmonic trap in FIG. 3A. This energy spectrum is also used to calculate the energy difference $|\Delta U/2|$ for display in FIG. 2D. For the theoretical energy difference in FIG. 3C (main panel), the measured recoil gap frequency of 140.76(3) Hz at zero interactions is added as a Rabi coupling to the spectrum of FIG. 3A, likewise for other lattice depths reported in the inset.

Recoil Gap Calculation

The magnitude of the recoil gap at vanishing interactions in a 1D lattice potential can be derived using perturbation theory. Corrections proportional to $z^4$ in the potential are included up to second order in perturbation theory, and corrections proportional to $z^6$ are included to first order in perturbation theory. The resulting energy of vibrational state $|n\rangle$ in a lattice potential $VE_R \sin^2(\pi z/a_z)$ to this order is $$E_n = 2E_R\sqrt{V}\left(n+\frac{1}{2}\right) - E_R\left(\frac{2n^2+2n+1}{4}\right) - E_R\frac{1}{\sqrt{V}}\left(\frac{2n^3+3n^2+3n+1}{16}\right).$$

The recoil gap between the pair states $|1,1\rangle$ and $|0,2\rangle_s$ is $$2E_1 - (E_2 + E_0) = E_R\left(1 + \frac{9}{8\sqrt{V}}\right).$$

Exact energies can be obtained from solutions to Mathieu's equation.

Interacting Energy Gap Calculation

The two atoms interact via a delta function potential $\hat{U}=(4\pi\hbar a_{3D}/m)\delta^{(3)}(r_1-r_2)$. The first order perturbative energy shift $\langle \hat{U}\rangle$ for a given state is more easily evaluated in the basis of suitably normalized center-of-mass and relative coordinates, $R\equiv(r_1+r_2)/\sqrt{2}$ and $r\equiv(r_1-r_2)/\sqrt{2}$, respectively.

First, calculate $\langle \hat{U}\rangle$ for the ground state. At vanishing interactions, in the absence of anharmonicity, the ground state of the trap is the harmonic oscillator ground state in x, y, and z for both atoms, $$\Psi(r_1, r_2) = \prod_{\mu\in\{1,2\}, i\in\{x,y,z\}} \frac{e^{-(r_{\mu,i}/l_i)^2/2}}{(\pi l_i^2)^{\frac{1}{4}}},$$

where $l_i=\sqrt{\hbar/m\omega_i}$ is the harmonic oscillator length for coordinate $r_{\mu,i}$. To evaluate $\langle \hat{U}\rangle$, one can transform to R and r coordinates. The form of the wavefunction is identical, $$\Psi(R, r) = \prod_{i\in\{x,y,z\}} \frac{e^{-(R_i/l_i)^2/2}}{(\pi l_i^2)^{\frac{1}{4}}} \frac{e^{-(r_i/l_i)^2/2}}{(\pi l_i^2)^{\frac{1}{4}}},$$

and the form of $\hat{U}$ is $(4\pi\hbar^2 a_{3D}/m)[\delta^{(3)}(r)/2^{3/2}]$. The operator $\hat{U}$ does not affect the coordinate R, and the wavefunctions of R are already normalized. Thus, the ground state energy shift at weak interactions is $$U \equiv \langle \hat{U}\rangle = \frac{4\pi\hbar^2 a_{3D}}{m}\frac{1}{2^{3/2}}\frac{1}{\pi^3 l_x l_y l_z}.$$

In a quasi-1D geometry, the transverse wavefunction (i.e., for motion along x and y) remains in the harmonic ground state for weak interactions. One can then work in the basis of normalized harmonic oscillator states of the rotated z coordinates, $z_c=(z_1+z_2)/\sqrt{2}$ and $z_r=(z_1-z_2)/\sqrt{2}$, with the understanding that the transverse state is the ground state. As explained above, the two pair qubit states can be written as $|2\rangle_{COM}|0\rangle_{rel}=(|0,2\rangle_s+|1,1\rangle)/\sqrt{2}$ and $|0\rangle_{COM}|2\rangle_{rel}=(|0,2\rangle_s-|1,1\rangle)/\sqrt{2}$. The interaction energy shift depends solely on the magnitude of the relative wavefunction at $z_{rel}=0$, which is a factor of $\sqrt{2}$ smaller in state $|2\rangle_{rel}$ than in state $|0\rangle_{rel}$. Thus, the energy shift is $U/2$ for $|0\rangle_{COM}|2\rangle_{rel}$, while it is U for $|2\rangle_{COM}|0\rangle_{rel}$.

Qubit Control Protocols

Figures 6A, 6B, 6C:
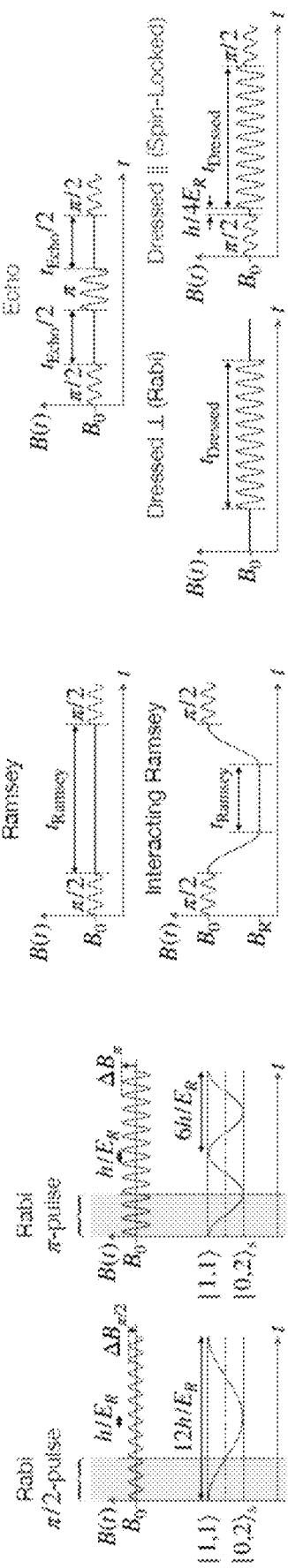
FIG. 6A illustrates a qubit control protocol to transfer population between the fermion pair qubit eigenstates at the recoil gap via a Rabi drive of interactions using the magnetic field.
FIG. 6B illustrates protocols for Ramsey measurements of the qubit energy splitting $|\Delta E|$.
FIG. 6C illustrates protocols for measuring coherence at the recoil gap as shown in FIGS. 4A-4D.

FIGS. 6A-6C show the protocols used to control the fermion pair qubit by tuning the interaction strength via the magnetic field (e.g., using the magnetic field coils 540 in FIGS. 5A and 5C). To achieve population transfer between the $|1,1\rangle$ and $|0,2\rangle_s$ states, the fermion pairs are initialized at the recoil gap. Aside from an overall offset, the static effective Hamiltonian near the recoil gap is $$H = \frac{E_R}{2}\sigma_z + \frac{U}{4}\sigma_x$$

in the basis $|1,1\rangle$, $|0,2\rangle_s$, where $\sigma_z$ and $\sigma_x$ are the Pauli matrices. FIG. 6A shows that a Rabi oscillation is driven by modulating the interaction energy U by $\Delta U$ about vanishing interactions at the recoil gap frequency, $$H(t) = \frac{E_R}{2}\sigma_z + \frac{\Delta U}{4}\sin(E_R t/\hbar)\sigma_x.$$

This Hamiltonian is produced by sinusoidal modulation of the magnetic field, $B(t)=B_0+\Delta B \sin(E_R t/\hbar)$, with $B_0=209.094$ G being the field where the interactions vanish. The resulting frequency of Rabi oscillation is $f_{Rabi}=\Delta U/4h$. Each drive operation begins as a sine wave, and the applied amplitude $\Delta B$ is varied to achieve a $\pi/2$-pulse (left panel of FIG. 6A, $f_{Rabi}=E_R/12h$, $\Delta B_{\pi/2} \approx 50$ mG) or $\pi$-pulse (right panel of FIG. 6A, $f_{Rabi}=E_R/6h$, $\Delta B_{90/2} \approx 100$ mG) in exactly 3 drive cycles.

In a Ramsey measurement (FIG. 3 data), a $\pi/2$-pulse creates a superposition of $|1,1\rangle$ and $|0,2\rangle_s$, the two states acquire a relative phase due to their energy difference, and a $\pi/2$-pulse re-interferes the superposition (FIG. 6B, upper panel). A Ramsey measurement at finite interactions proceeds analogously, with the addition of magnetic field ramps to and from a test magnetic field $B_R$ (lower panel). The ramps between $B_0$ and $B_R$ are adiabatic and have a fixed shape and timing. They thus prepare a precise superposition at field $B_R$ with a fixed initial relative phase. Varying the intermediate hold time $t_{Ramsey}$ at $B_R$ then drives additional relative phase accumulation, determined only by the qubit energy splitting at $B_R$, which is detected via re-interference.

FIG. 6C shows protocols for measuring the coherence data in FIGS. 4A-4D. A $\pi$-pulse is added to the midpoint of the Ramsey protocol to perform an echo sequence (upper panel). Echo coherence measurements at finite interactions proceed identically, with two additional sets of field ramps to allow phase evolution at a desired field. In the $\perp$ dressed state protocol (lower left panel), a Rabi drive is continually applied at the $\pi$-pulse amplitude. In the $\parallel$ dressed state protocol (lower right panel), a $\pi/2$-pulse is followed by a delay by a quarter of the recoil gap period, sinusoidal dressing, and a final $\pi/2$-pulse. Viewed in the frame rotating with the drive, each pulse provides a static quantization on the Bloch sphere of states $|1,1\rangle$ and $|0,2\rangle_s$. The first $\pi/2$-pulse is along the x-axis and rotates the state from the z-axis to y-axis. The $h/4E_R$ delay then leaves the state unchanged but ensures that the subsequent applied dressing is along the y-axis, aligned with the state vector. The final $\pi/2$-pulse lies in the x-y plane of the rotating frame. The orientation of this pulse rotates with the dressing time, leading to oscillation.

Strong Driving

FIG. 7 shows the fermion pair qubit dynamics under strong driving, with a Rabi coupling comparable to the energy splitting of the effective two-level system. The observed multiple frequencies in the response are analogous to the transition frequencies between eigenstates of a two-level atom dressed by light at strong driving. Initializing a specific state where the atom and field are not coupled prepares a superposition of more than two eigenstates of the strongly coupled system, leading to multi-frequency interference.

Coherence at Strong Interactions

FIG. 8 shows the decay of fermion pair qubit coherence at strong interactions. For each repeated experiment at a fixed total time $t_{Echo}$, a random extra phase from 0 to $2\pi$ is added to the fermion pair qubit by redistributing evolution time before and after the echo $\pi$-pulse. The standard deviation of the signal $n_{|1,1\rangle}$ then decays due to loss of coherence within the register array, from which the coherence time is obtained, shown in FIG. 4B.

Local Single-Qubit Gates

Local addressing can be used to implement single-qubit gates among the fermion pair qubits in the quantum register. Locally altering the fermion pair confinement is entirely sufficient for arbitrary local control and can be accomplished on a specific lattice site using far-off resonant optical tweezers, for example. Optical tweezers can be implemented in quantum gas microscopes with single-site resolution in a dense 2D lattice.

An optical tweezer can double the trap depth on a given lattice site with an optical power level as low as 150 μW for $^{40}$K atoms, with a negligible rate of photon scattering. This increase in confinement nearly doubles the speed of phase winding at finite interactions per the scaling of the interaction energy with the trap depth V given below. Thus, local gates can easily be engineered to proceed at the same rate as any global gate demonstrated here, with good dynamic range.

In addition, other schemes exist for fast, local control. In a localized Raman scheme, for example, local co-propagating Raman beams can cause hyperfine changes dependent on the atom pair state, rapidly advancing the phase and coming back to the original hyperfine state. Alternatively, optical Feshbach resonances can be used, where optical coupling can be used to shift the energy of the molecular state which produces the resonance, thereby changing the effective induced interaction strength. The interaction strength can thus potentially be modulated at speeds exceeding 1 MHz.

Gate Speeds

There are two processes that drive gates for a fermion-pair qubit: (1) the recoil energy sets a default rotation rate about one axis of the qubit; and (2) interaction modulation or tuning sets the rotation rate about another axis of the qubit. The dynamic speed of the second process and hence of a single-qubit gate can be varied by interaction tuning (e.g., as in FIGS. 3A-3C) or Rabi driving beyond the rotating wave approximation (e.g., as in FIG. 7). Achievable gate speeds can exceed hundreds of Hz or kHz. Even beyond that, the large non-linearity of the recoil gap allows the qubit flipping to proceed at rates even approaching the harmonic frequency, which, in principle, is an energy separation that is 200 times larger than the recoil energy gap. This is a benefit of encoding the quantum information in motional states of pairs: the gap between the qubit states is the recoil energy, while the gap to the next available states of pairs is the harmonic energy.

The speed of rotations around the recoil gap axis of the Bloch sphere is controlled by the recoil energy. The 140 Hz rotation speed for a 3-micron lattice can be increased by decreasing the lattice spacing in the z direction, decreasing the fermion mass, or both. For example, using a 532 nm lattice increases the rotation speed to 4.4 kHz. The lighter fermion lithium-6 in a 532 nm lattice increases the recoil energy further to 30 kHz. Focused tweezers can increase in the recoil frequency locally and dynamically by changing the spatial potential experienced by the fermions. More specifically, an optical tweezer can change both the depth of the effective harmonic trap and the quartic corrections to the harmonic trap potential. The value of the energy gap at vanishing interactions (the recoil energy) is determined by the precise geometric nature of the optical lattice potential. Changing the geometry of this potential with an optical tweezer changes the value of the energy gap (recoil energy). These changes enable universal, local, single-qubit control at speeds near 30 kHz. Given qubit coherence times exceeding tens of seconds, this can yield qubit error rates below $10^{-5}$.

Rydberg-Based Two-Qubit Gates

Long range interactions between fermion-pair qubits on different lattice sites can be induced through Rydberg excitation of fermion pairs, which allow two-qubit gates to be performed between separate pairs of fermions at rates approaching MHz timescales. Established technology for Rydberg excitation with localized addressing lasers can be directly employed. Here, the Rydberg laser excites the pair of fermions into a molecular Rydberg state, dependent on the initial state of the pair of fermions.

Collisional Two-Qubit Gates

A collisional two-qubit gate can be implemented by lowering the barrier between adjacent lattice sites with a targeted optical tweezer, causing the fermion pairs from the adjacent lattice sites to collide and acquire a state-dependent phase due to interactions, then separating the fermion pairs and restoring the barrier between the adjacent lattice sites. The timescale for a controlled collision two-qubit gate is set by the timescale to ramp down a lattice well, have atoms collide, and leave again. Collisions between the qubits can be made resonantly strong (e.g., as in FIG. 3C) using the magnetic field or can be tuned via localized Raman laser beams that access a Feshbach resonance in another hyperfine state. Therefore, the two-qubit gate speeds are limited only by the timescales for altering the spatial potential, set by the energy gap to nearby states, the harmonic energy.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of storing quantum information, the method comprising:
    trapping pairs of fermions in respective elongated harmonic potential wells formed in an optical lattice; and
    initializing the pairs of fermions in a qubit basis comprising a first state and a second state separated by an energy difference depending on a geometry of the optical lattice.

2. The method of claim 1, wherein the energy difference between the first state and the second state is equal to $E_r = \hbar^2 \pi^2/(2ma_z^2)$, where m is a mass of one fermion, $a_z$ is a spacing of the optical lattice in the z direction, and the elongated harmonic potential wells are elongated in the z direction.

3. The method of claim 1, wherein the first state and the second state are vibrational states of the pairs of fermions.

4. The method of claim 1, wherein the first state is an excited state for a center of mass motion and a ground state for relative motion of fermions in the pairs of fermions and the second state is a ground state for the center of mass motion and an excited state for relative motion of the fermions in the pairs of fermions.

5. The method of claim 1, further comprising:
    splitting one of the elongated harmonic potential wells into a double harmonic potential well; and
    fluorescence imaging the pair of fermions in the double harmonic potential well.

6. The method of claim 1, further comprising:
    causing one of the pairs of fermions to undergo an avoided crossing between the first state and the second state.

7. The method of claim 6, wherein causing one of the pairs of fermions to undergo the avoided crossing comprises ramping a magnetic field across the corresponding elongated harmonic potential well.

8. The method of claim 1, further comprising:
    modulating a magnetic field applied to the pairs of fermions to increase a coherence time of the pairs of fermions.

9. A system for storing quantum information, the system comprising:
    a vacuum chamber to hold a fermionic gas;
    a laser, in optical communication with the fermionic gas, to generate an optical lattice having elongated harmonic potential wells, each elongated harmonic potential well trapping one pair of fermions of the fermionic gas; and
    a magnetic field source, in electromagnetic communication with the pairs of fermions, to ramp a magnetic field across the fermionic gas, the magnetic field initializing the pairs of fermions in a qubit basis comprising a first state and a second state separated by an energy difference depending on a geometry of the optical lattice.

10. The system of claim 9, wherein the energy difference between the first state and the second state is equal to $E_r = \hbar^2 \pi^2/(2ma_z^2)$, where m is a mass of one fermion, $a_z$ is a spacing of the optical lattice in the z direction, and the elongated harmonic potential wells are elongated in the z direction.

11. The system of claim 9, wherein the first state and the second state are vibrational states of the pairs of fermions.

12. The system of claim 9, wherein the first state is an excited state for a center of mass motion and a ground state for relative motion of fermions in the pairs of fermion and the second state is a ground state for the center of mass motion and an excited state for relative motion of the fermions in the pairs of fermion.

13. The system of claim 9, further comprising:
    a detector, in optical communication with the pairs of fermions, to image fluorescence emitted by at least one of the pairs of fermions.

14. The system of claim 9, wherein the magnetic field source is configured to ramp the magnetic field across one of elongated harmonic potential well to cause the corresponding pair of fermions to undergo an avoided crossing between the first state and the second state.

15. The system of claim 9, wherein the magnetic field source is configured to modulate the magnetic field applied to the pairs of fermion to increase a coherence time of the pairs of fermion.

16. The system of claim 9, wherein the laser is a first laser, and further comprising:
    a second laser, in optical communication with the pairs of fermions, to illuminate at least one of the pairs of fermions with an optical tweezer beam.

17. A method of representing a qubit with a first quantum object and a second quantum object, the method comprising:
    trapping the first quantum object and the second quantum object in a potential energy landscape realizing a potential well having quartic corrections, wherein energy corrections to the first quantum object and to the second quantum object due to the quartic corrections are independent of a magnitude scale factor of the potential energy landscape;
    encoding a first state of the qubit with the first quantum object and the second quantum object in a first set of states of the potential well; and
    encoding a second state of the qubit with the first quantum object and the second quantum object in a second set of states of the potential well.

18. The method of claim 17, wherein the first quantum object comprises a first fermion and the second quantum object comprises a second fermion.

19. The method of claim 17, wherein the first set of states of the potential well comprises a first motional state and a second motional state and the second set of states of the potential well comprises a third motional state and a fourth motional state different than the first motional state and second motional state.

20. The method of claim 17, wherein energy levels of the states in the first set of states sum to a value equal to a sum of energy levels of the states in the second set of states, before including the quartic corrections.

* * * * *